United States Patent [19] [11] Patent Number: 6,064,337
Hirosawa [45] Date of Patent: May 16, 2000

[54] GLOBAL INFORMATION PROVIDING SYSTEM

[75] Inventor: Yasushi Hirosawa, Yokohama, Japan

[73] Assignee: System Box, Inc., Tokyo, Japan

[21] Appl. No.: 09/145,435

[22] Filed: Sep. 2, 1998

[30] Foreign Application Priority Data

Sep. 4, 1997 [JP] Japan .................. 9-239511

[51] Int. Cl.[7] .................. G01S 5/02; H04B 7/185
[52] U.S. Cl. .................. 342/357.13; 342/357.06; 701/213
[58] Field of Search .................. 342/357.06, 357.13, 342/25, 179, 191, 197; 701/207; 348/144–147

[56] References Cited

U.S. PATENT DOCUMENTS

| | | | |
|---|---|---|---|
| 4,903,212 | 2/1990 | Yokouchi et al. | 364/449 |
| 5,323,152 | 6/1994 | Morita | 340/998 |
| 5,596,494 | 1/1997 | Kuo | 364/420 |
| 5,654,890 | 8/1997 | Nicosia | 364/428 |
| 5,777,573 | 7/1998 | Klausing et al. | 342/25 |
| 5,790,188 | 8/1998 | Sun | 348/144 |
| 5,835,054 | 11/1998 | Warhus et al. | 342/22 |

Primary Examiner—Thomas H. Tarcza
Assistant Examiner—Dao L. Phan
Attorney, Agent, or Firm—Howell & Haferkamp, LC

[57] ABSTRACT

To present a compact global information providing system which can provide necessary global information without an expensive device in real-time for condition changeable objects, the global information providing system is comprised of a first processing system for positional computing with the global information data and output the result, a second processing system for processing the global information data from the weather or remote sensing satellites and outputs the image data, and a third processing system including a memory unit for storing the image data of aerial photograph or video image, wherein the first processing system is provided with a collelator which determines the time difference based on C/A code included in the global information data sent from the positioning satellites and position computing unit which performs positional computing based on the time difference data determined by the collelator and outputs the result, the second processing system is provided with a wavelength/reflectance correlator for generating a spectroscopic curve of wavelength and reflectance for global information data sent from the weather or remote sensing satellites and a correction unit for correcting the data with respect to noise and distortion caused by sensors or scanners of satellites, and temperature and light amount in data transmission space.

32 Claims, 1 Drawing Sheet

GLOBAL INFORMATION PROVIDING SYSTEM

BACKGROUND OF THE INVENTION

1. Field of the Invention

The present invention relates to a global information providing system which presents accurately, and in real-time, information on the static and dynamic conditions of, and changes in, the earth (hereafter referred to as "global information") such as the condition of equipment, roads, and moving objects on the ground, the condition of the surface of the earth, and the condition of the atmosphere and the sea as well as geographical information on land and marine regions.

2. Description of the Prior Arts

A considerable number of satellites are currently in static or dynamic orbit around the earth, such as global positioning satellites (GPS), weather observing satellites (e.g. Himawari), hereafter referred to as "weather satellites", and remote sensing satellites (e.g. Landsat), each transmitting relevant information to earth. This information is widely employed in applications such as weather observations and as weather information, car navigation systems, or for military purposes, and geological and marine surveys. Aerial photography has been employed for a considerable time as an effective means of obtaining geographical information, and images from video cameras are used in the analysis of such structures as bridge piers and buildings.

Typical examples of global information sources, and their applications, are shown in Table 1.

SUMMARY OF THE INVENTION

The present invention has been made in view of the points abovementioned, and its object is to provide a compact system for supplying the required global information on changing phenomena in real-time, and without need for expensive equipment. To achieve the object abovementioned, the global information providing system of the present invention is provided with a first processing system which performs positional computing with global information data from global positioning satellites and outputs results thereof, a second processing system which performs processing of the global information data from weather or remote sensing satellites and outputs image data, and a third processing system which includes a memory unit for storing image data representing aerial photographs and video images, wherein the first processing system comprises a correlator for determination of the time difference data based on C/A code included in global information data sent from the positioning satellites and a position computing unit for performing positional computing based on time difference data determined by the correlator and outputting the result, and the second processing system comprises a correction unit for correcting the global information data generated by weather or remote sensing satellites with respect to noise and distortion caused by sensor or scanner mounted on said satellites, temperature and light amount of data transmission space, and the system is configured so that the image data output from the third processing system is processed by the same processing system with the correction unit output of the second processing system.

An A/D converter and correlator in the first processing system, an A/D converter, a data compression unit, and a

TABLE 1

|  | Global positioning satellites | Weather satellites | Remote sensing satellites | Aerial photography | Video |
|---|---|---|---|---|---|
| Urban planning | ○ |  | ○ | ○ |  |
| National land planning |  | ○ | ○ | ○ |  |
| Forestry management | ○ |  | ○ | ○ | ○ |
| Ocean management |  | ○ | ○ |  |  |
| Environmental management |  | ○ | ○ |  |  |
| Natural resource surveys |  |  | ○ | ○ | ○ |
| Road management | ○ |  | ○ | ○ | ○ |
| Management of buried equipment and facilities |  |  |  | ○ | ○ |
| Land ownership management | ○ |  |  |  | ○ |

These sorts of global information are used according to each purpose, however they are subject to limits in accuracy and processing speed due to the systems of measurement and data processing employed. Global information data from satellites must be batch-processed, so that real-time information on changing phenomena associated with moving objects, the condition of the earth's surface, the atmosphere, and the sea etc are not available. Conversion of aerial photographs into electronic data requires extremely expensive equipment for analysis and generation of charts, and skilled operators, with the result that information becomes extremely expensive. Processing of global information data by software requires complex equipment, and considerable time is required for computation.

correction unit in the second processing system, and a memory unit and data compression unit in the third processing system, are all implemented in firmware.

DETAILED DESCRIPTION OF THE PREFERRED EMBODIMENTS

Figure 1:
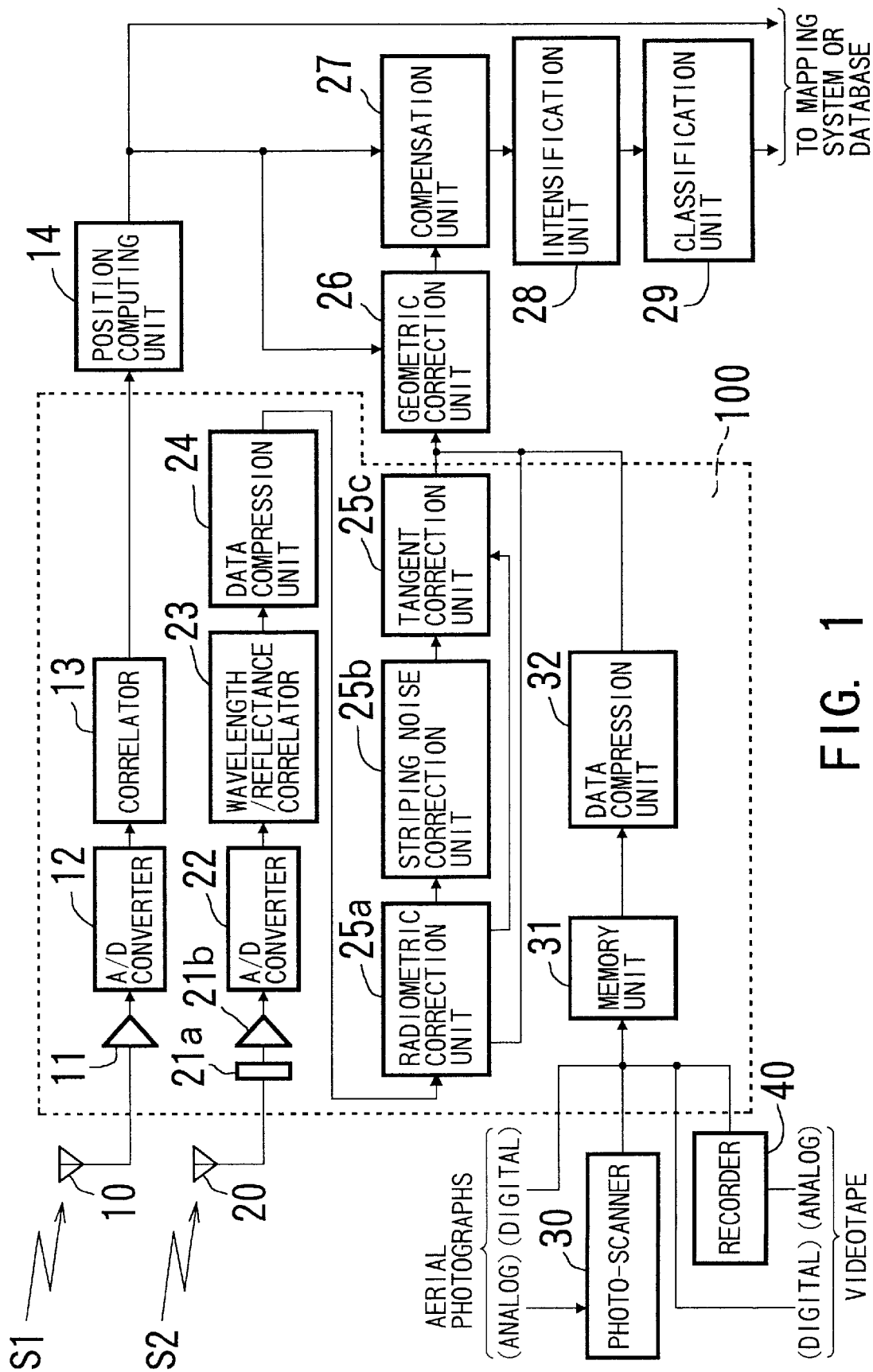
FIG. 1 is a block diagram showing the schematic arrangement of an embodiment of the global information providing system covered by the present invention.

The present invention is described below by reference to the drawings.

FIG. 1 is a block diagram which shows schematic arrangement of an embodiment of the global information providing system covered by the present invention.

In an embodiment of the present invention, an example is shown wherein data from four sources—global positioning satellites (GPS), weather and remote sensing satellites, aerial photographs, and video tape, are employed as global information data. In the example given below global information data from both weather satellites and remote sensing satellites is received in the form of electromagnetic waves, and both may therefore be processed using the same algorithm. The term "weather and remote sensing system" is therefore used to refer to both weather and remote sensing systems, or to either one of the two.

The first information source is global positioning satellites which transmit signals including C/A codes, at a frequency of 1575.42 MHz. 10 is an antenna for receiving the signals S1 from four or more global positioning satellites. 11 is an amplifier designed to amplify the weak signal received. 12 is an A/D converter adapted to convert the amplified signal to a digital signal. 13 is a correlator used to determine the time difference between the C/A codes transmitted by four or more satellites. 14 is a position computing unit which computes satellite positions, distances to satellites, position of the receiver, and time correction for the receiver etc., based on the phase difference between the time difference data and the C/A code received from correlator 13, and the phase difference in the carrier wave, and extracts the latitude, longitude, height, time, speed and satellite receiving status etc.

The second information source is weather or remote sensing satellites which transmit electromagnetic waves (ultraviolet light, visible light, infrared light, microwaves) as global information. 20 is an antenna designed to receive electromagnetic waves S2 transmitted from the satellite. 21$a$ is a filter adapted to switch the frequency of the electromagnetic waves to be received. 21$b$ is an amplifier for amplify weak electromagnetic waves after they have passed through the filter. 22 is an A/D converter for converting the amplified signal into a digital signal. As the spectral reflectance of the object measured varies depending upon its type and location, 23 is a wavelength/reflectance correlator which measures the brightness of the spectral radiating and expresses the relationship between the wavelength and rate of reflectivity of the object as a spectroscopic curve. 25$a$ is the radiometric correction unit for correcting data for the effects of variation in position of the radiating source, the atmosphere, the object, the sensors, the temperature over the transmission distance, and light intensity. 25$b$ is the striping noise correction unit for correcting for band-like striping noise generated due to variations in the sensitivity of sensors. 25$c$ is the tangent correction unit for correcting distortions in coordinate data generated with vibrating or rotating scanners in the remote sensing satellite. 26 is the geometric correction unit for correcting the data obtained for geometric distortion, for factors which affect purpose of use, such as the shape and extent of the analyzed area and the method of projection used (e.g., Mercator projection), and for computation of height. 27 is the compensation unit for correcting displacement and thus ensure correspondence between input and output data for display. 28 is the intensification unit for spectral intensification to obtain optimum contrast in multidimensional spectroscopic images, for spatial intensification to intensify shape, direction, and size of objects, and to convert and intensify the spectrum of raw data as appropriate for it's final use. 29 is a classification unit for classifying image data using pattern recognition and other methods. The geometric correction unit 26, the compensation unit 27, the intensification processing unit 28, and the classification unit 29 are described in detail later.

The third information source is analog or digital aerial photographs. 30 is a high-resolution photoscanner for converting analog aerial photographs to digital image data. 31 is a memory unit for storing the digital image data. 32 is a data compression unit for compression of the image data.

The fourth information source is analog or digital video tape. 40 is a recorder for converting images recorded on analog video tape to digital image data. After conversion of analog image data to digital form, the digital image data is stored directly in the memory unit 31.

Left and right images of the same object taken at two slightly different angles are used with both aerial photographs and video images. The use of image compression reduces (e.g. by a factor of $\frac{1}{8}$ to $\frac{1}{20}$) the amount of image data obtained from these information sources to an amount similar to that from weather and remote sensing satellites.

The above describes the schematic arrangement of the global information providing system covered by the present invention. It should be noted that this system is designed for use with four or more global positioning satellites, with accuracy of measurement improving as the number of satellites is increased.

The following describes the characteristics of the global information providing system in detail.

In this system, data from weather and remote sensing satellites are subject to geometric correction, compensation, intensification, and classification. The image data from the weather and remote sensing satellites includes complex geometric distortions, and some form of geometric transformation is essential if it is to be employed for measurement purposes. As this image data is used for a variety of purposes such as geographical maps, classification maps, theme maps, evaluation maps, and height calculations, corrections appropriate to the final purpose, application, and theme etc., are required. Various types of geometric corrections are employed, for example, geometric correction of multi-spectral scanning (MSS) data is appropriate for analysis of narrow and wide areas, image data from satellites in orbit is corrected as appropriate for the map projection (e.g. Mercator, Lambert) method employed on the surface of the earth, and the use of stereo image data involves measurement of the same point from differing positions, and correction for differences in height. Geometric correction applied for these various purposes employs such methods as Helmert transformation, Affine transformation, pseudo-Affine transformation, secondary isometric transformation, secondary oblique transformation, and high order polynomials, and the appropriate transformation is selected for the wavelength of the electromagnetic waves received from the satellites, and the desired image processing.

The transformations noted above are as follows when transforming the image data obtained (u, v) to the map control point (x, y).

Helmert transformation $$u = a_0 + a_1 x + a_2 y$$

$$v = b_0 - a_2 x + a_1 y$$

Affine transformation $$u = a_0 + a_1 x + a_2 y$$

$$v = b_0 + b_1 x + b_2 y$$

Pseudo-Affine transformation $$u = a_0 + a_1 x + a_2 y + a_3 xy$$

$$v = b_0 + b_1 x + b_2 y + b_3 xy$$

Secondary isometric transformation $$u = a_0 + a_1 x + a_2 y + a_3 xy + a_4 (x^2 - y^2)$$

$$v = b_0 + b_1 x + b_2 y + b_3 xy + b_4 (x^2 - y^2)$$

Secondary oblique transformation $$u = (a_0 + a_1 x + a_2 y)/(1 + c_1 x + c_2 y)$$

$$v = (b_0 + b_1 x + b_2 y)/(1 + c_1 x + c_2 y)$$

High order polynomials $$u = a_0 + a_1 x + a_2 y + a_3 xy + a_4 x^2 + \ldots a_m x^n y^n$$

$$v = b_0 + b_1 x + b_2 y + b_3 xy + b_4 x^2 + \ldots a_m x^n y^n$$

Note that $a_0, a_1, a_2, a_3, a_4, \ldots a_m, b_0, b_1, b_2, b_3, b_4, c_1$, and $c_2$ employed in these transformations are constants.

For example, the Helmert transformation is employed when processing is limited to parallel movement and rotation, and the Affine transformation is employed for linear transformations with independent x and y. The Affine transformation is sufficient for such applications as local land use classification maps. Linear transformations are no longer applicable when the image data contains distortional factors, and in such cases the psuedo-Affine transformation is employed. The secondary isometric transformation is employed in map projections and is ideal for correction of parabolic distortions. The highly accurate position data obtained from the position computing unit 14 is employed in geometric correction to generate highly accurate image data.

When the geometrically corrected image data is output to, for example, a display, displacement of the data occurs and further correction is required via the compensation unit 27. Compensation employs the nearest-neighbor, bi-linear, and cubic convolution methods. The nearest-neighbor method employs a weighting function to substitute each pixel in the output image with the nearest pixel in the input image, and thus prevents image fuzziness while requiring minimum processing time. The bi-linear method takes pixel data within a particular rectangle, applies an average weighting in inverse proportion to distance.

The following describes the spectral intensification, spatial intensification, and transformation intensification processing in the intensification processing unit 28.

Spectral intensification is employed to obtain the optimum contrast in a multidimensional spectroscopic image, and is used for the following.

(a) For pseudo-natural color images

Almost natural coloring. Provides clear distinction between land and sea.

(b) Infrared colored images

Shows clearly the distribution of vegetation areas, geological structures, and the presence of geological faults.

(c) Natural colored display

Images with the same coloring as that perceived with the human eye. Mountainous forested areas are displayed in green, the sea in blue, and flat plains in white.

(d) Intermediate infrared colored images

Forested areas are colored green, urban areas are colored dark blue to discriminate between flat and forested areas, and classification of vegetation areas.

(e) Gray level

Allows analysis of data included in the gradations between black and white.

(f) Level slice pseudo color

Colors are allocated to image data to obtain distinct color patterns, eg specific data within areas containing mineral resources is intensified for display.

(g) Linear stretching

Adjusts brightness and contrast.

(h) Non-linear stretching

Input data is processed to obtain the required output image.

(i) Histogram equalization

Input data is automatically intensified.

Spectral intensification is performed by computer and the results of the data output either as a map, or as a color graphic image. The latter method has the advantage that a process of interaction between the operator and the computer is possible to obtain the optimum image using the intensification algorithm.

The purpose of spatial intensification is to emphasize the shape, direction, and size of objects in the image. High-pass filters are employed to emphasize edges etc, and low-pass filters to de-focus the image and equalize sharp contrasts, and variable-coefficient filters to orient diagonal data.

Transformation and intensification are performed to convert the spectrum of raw data into a form to be used readily so that each pixel in the image data is handled freely. For example, it provides for more detailed analysis and display of information on the earth's surface, and allows the extraction of information buried in image data. One method of achieving this is the combination of electromagnetic waves of different wavelengths, and comparison and linear conjugation processing to display the characteristics of the image with increased clarity. This method allows an analysis of the degree of activity of vegetation in forested areas, and by displaying three image data on RGB video channel, and the creation of new data.

The following describes classification with the classification unit 29.

In the case where statistical analysis is performed with image data, objects on the ground obtained by the image data must be classified as either "existing objects" or "unknown objects". Vegetation, barren areas, grassland areas, and urban areas on classification maps are typical examples. Classification achieves this purpose, and is used both with and without pattern recognition. In the former case the position of forested areas is identified from aerial photographs and existing maps, these areas are found on the image display, and the operator then interactively assigns a file name to each area as classification. In the latter case the operator specifies a number of items of statistical data within the image data, and using this statistical data compares "unknown objects" and "existing objects and land," and extracts and classifies the "unknown objects."

Aerial photographs, the third information source, and video images, the fourth information source, are stored in the memory unit 31 as digital data which is compressed with the data compression unit 32, after which it is corrected in the geometric correction unit 26. Subsequent compensation, and the required intensification and classification, are the same as that employed with data from weather and remote sensing satellites.

The constitutional characteristics of the global information providing system covered by the present invention are described below.

(1) The portion 100 of the diagram enclosed by dotted lines in the figure is implemented in firmware.

As conversion to digital format with the A/D converters 11 and 21b, computation with the correlator 13 and the wavelength/reflectance correlator 23, and correction in the radiometric correction unit 25a, the striping noise correction unit 25b, and the tangent correction unit 25a is executed with a sufficiently large control memory and the microprogram (implemented in firmware). Data from multiple information sources is not only processed rapidly in parallel, but the speed of computing the time difference data in the correlator 13, and the processing in the wavelength/reflectance correlator 23, is increased so that computing speed is at least 50 times greater than that with conventional software processing. This speed allows information to be obtained on moving objects such as motor vehicles in real-time.

(2) Position computed from position data is used independently, as well in conjunction with data from weather and remote sensing systems, in geometric correction of image data, and for compensation.

Weather and remote sensing satellites are placed in sun-synchronous or asynchronous orbits at a height of 700 to 900 km, and at an inclination of 35° to 108° (average of 99°). This inclination results in slip in latitude and longitude, and altitude when projecting onto a map. In some cases, while the slip in latitude, longitude, altitude, and height above the sea in aerial photographs or video data are smaller than is the case with data from weather and remote sensing satellites, accuracy is still insufficient for the production of national two/three-dimensional maps.

The highly accurate results of the processing of position measurements (a maximum error of 10 mm in both latitude and longitude, and 20 mm in altitude and height, with the present system) are employed in geometric correction. The transformations noted above are employed in this correction, the use of the results (latitude and longitude data) in x and y in the transformations ensures that highly accurate image data is obtained. When the image data obtained contains altitude information, the use of the altitude data in the results of position measurement ensures highly accurate image data. The same applies to compensation—image data output from the geometric correction unit 26 is the standard point of processing with the compensation unit 27, and the accuracy of the input and output images are increased. As with processing of weather and remote sensing data the position measurement results based on the position data is also used in geometric correction and compensation of aerial photographs and video image data to generate highly accurate image data.

(3) Pattern recognition may be employed in the final stage of processing of weather and remote sensing data.

This is particularly useful in revealing information buried within image data such as the discovery of geological faults hidden by vegetation, and the search for camouflaged vehicles and weapons.

(4) A part of the weather and remote sensing data processing system is employed in processing aerial photographs and video images.

The use of part of an existing information processing system simplifies the overall processing system, and allows the same sophisticated processing employed for information from weather and remote sensing satellites to be used with aerial photographs and video images, thus providing highly accurate global information.

While global information from a minimum of four global positioning satellites is required for the implementation of the present invention, greater accuracy is achieved by increasing the number of satellites employed. On the other hand, if global information of high accuracy is not required, radiometric correction, striping correction, and tangent correction in the processing system of the global information received from weather and remote sensing satellites may be dispensed with as necessary. The same applies to subsequent compensation, intensification, and classification.

The present invention may be implemented in the form of processing limited to global information from weather satellites, processing limited to global information from remote sensing satellites, or processing of information from both types of satellites as weather and remote sensing data. The same applies for aerial photographs, video images, or both.

As described above, the present invention provides global information from global positioning satellites, weather and remote sensing satellites, aerial photographs, and video images in the appropriate type, form, and accuracy. Part of the circuitry for processing global information is implemented in firmware to improve processing speed so that, for example, the position data of moving objects such as vehicles within an area may be provided in real-time. Furthermore, global information from weather and remote sensing satellites is corrected and finally processed with the use of position measurement results computed (to maximum error at full size of 10 mm in latitude and longitude, and 20 mm in height) from global information received from global positioning satellites, and image data appropriate for the required purpose, topic, and application is obtained from highly accurate global information. As part of a system employed for the processing system of image data in global information from weather and remote sensing satellites is used in the processing of global information from aerial photographs and video images, the system is arranged to be very compact. At the same time, although highly accurate data had been obtained by an analysis graphical format converter, which is expensive and required a highly experienced operator to produce highly accurate image data, the data can be obtained cheaply with a simple device by this invention.

What is claimed is:

1. A global information providing system comprising a first processing system which performs positional computing with global information data from global positioning satellites and outputs results thereof, a second processing system which performs processing of the global information data from weather or remote sensing satellites and outputs image data therefrom, and a third processing system which includes a memory unit for storing image data of aerial photograph and video image, wherein said first processing system is provided with a correlator which determines time difference data based on a C/A code included in the global information data sent from the positioning satellites, and a position computing unit which performs positional computing based on the time difference data determined by said correlator and outputs a result, and said second processing system is provided with a wavelength/reflectance correlator for generating a spectroscopic curve of wavelength and reflectance for global information data sent from the weather or remote sensing satellites and a correction unit for correcting the data sent from the weather or remote sensing satellites with respect to noise and distortion caused by sensors or scanners mounted on the weather or remote sensing satellites, and temperature and light amount in data transmission space.

2. A global information providing system as set forth in claim 1, wherein said second processing system is provided with a geometric correction unit for geometric correction of image data corrected by the correction unit, and in accordance with a final application of the global information providing system and for distortion correction.

3. A global information providing system as set forth in claim 2, wherein said geometric correction unit includes means for geometric correction employing at least one member of the group consisting of Helmert transformation, Affine transformation, pseudo-Affine transformation, secondary isometric transformation, secondary oblique transformation, and high order polynomials.

4. A global information providing system as set forth in claim 1, wherein said second processing system is provided with a data compression unit for compression of global information data, and said third processing system is provided with a data compression unit for compression of image data of aerial photograph and video image data.

5. A global information providing system as set forth in claim 4, wherein the A/D converter and the correlator provided in said first processing system, the A/D converter, wavelength/reflectance correlator, data compression unit, and correction unit provided in said second processing system, and the memory unit and the data compression unit provided in said third processing unit, are implemented in firmware.

6. A global information providing system as set forth in claim 1, wherein one or more of radiometric correction, striping noise correction, and tangent correction is implemented in the correction unit in said second processing system.

7. A global information providing system as set forth in claim 2, wherein said second processing system is provided with a compensation unit for processing of input and output image data corrected with said geometric correction unit.

8. A global information providing system as set forth in claim 7, wherein said second processing system is provided with an intensification unit for intensification of output from the compensation unit and the intensification comprises at least one of spectral intensification, spatial intensification, and transformation intensification.

9. A global information providing system as set forth in claim 8, wherein said second processing system is provided with a classification unit for classification of output from said intensification unit using pattern recognition.

10. A global information providing system as set forth in claim 2, wherein image data processed in said third processing system is corrected by the geometric correction unit provided in said second processing unit.

11. A global information providing system as set forth in claim 7, wherein image data corrected by said geometric processing unit is further processed by said compensation unit.

12. A global information providing system as set forth in claim 2, wherein the measurement results output from said first processing system are employed in correction by the geometric correction unit in said second processing system.

13. A global information providing system as set forth in claim 7, wherein the measurement results output from said first processing system are employed in correction by the geometric correction unit in said second processing system.

14. A global information providing system as set forth in claim 2, wherein said second processing system is provided with a data compression unit for compression of global information data, and said third processing system is provided with a data compression unit for compression of image data of aerial photograph and video image data.

15. A global information providing system as set forth in claim 3, wherein said second processing system is provided with a data compression unit for compression of global information data, and said third processing system is provided with a data compression unit for compression of image data of aerial photograph and video image data.

16. A global information providing system as set forth in claim 14, wherein the A/D converter and the correlator provided in said first processing system, the A/D converter, wavelength/reflectance correlator, data compression unit, and correction unit provided in said second processing system, and the memory unit and the data compression unit provided in said third processing unit, are implemented in firmware.

17. A global information providing system as set forth in claim 15, wherein the A/D converter and the correlator provided in said first processing system, the A/D converter, wavelength/reflectance correlator, data compression unit, and correction unit provided in said second processing system, and the memory unit and the data compression unit provided in said third processing unit, are implemented in firmware.

18. A global information providing system as set forth in claim 2, wherein one or more of radiometric correction, stripping noise correction, and tangent correction is implemented in the correction unit in said second processing system.

19. A global information providing system as set forth in claim 3, wherein one or more of radiometric correction, stripping noise correction, and tangent correction is implemented in the correction unit in said second processing system.

20. A global information providing system as set forth in claim 4, wherein one or more of radiometric correction, stripping noise correction, and tangent correction is implemented in the correction unit in said second processing system.

21. A global information providing system as set forth in claim 5, wherein one or more of radiometric correction, stripping noise correction, and tangent correction is implemented in the correction unit in said second processing system.

22. A global information providing system as set forth in claim 14, wherein one or more of radiometric correction, stripping noise correction, and tangent correction is implemented in the correction unit in said second processing system.

23. A global information providing system as set forth in claim 15, wherein one or more of radiometric correction, stripping noise correction, and tangent correction is implemented in the correction unit in said second processing system.

24. A global information providing system as set forth in claim 16, wherein one or more of radiometric correction, stripping noise correction, and tangent correction is implemented in the correction unit in said second processing system.

25. A global information providing system as set forth in claim 17, wherein one or more of radiometric correction, stripping noise correction, and tangent correction is implemented in the correction unit in said second processing system.

26. A global information providing system as set forth in claim 3, wherein image data processed in said third processing system is corrected with the geometric correction unit provided in said second processing unit.

27. A global information providing system as set forth in claim 7, wherein image data processed in said third processing system is corrected with the geometric correction unit provided in said second processing unit.

28. A global information providing system as set forth in claim 9, wherein image data processed in said third processing system is corrected with the geometric correction unit provided in said second processing unit.

29. A global information providing system as set forth in claim 8, wherein image data corrected with said geometric processing unit is further processed with said compensation unit.

30. A global information providing system as set forth in claim 9, wherein image data corrected with said geometric processing unit is further processed with said compensation unit.

31. A global information providing system suitable for providing geometrically corrected data representative of sensed conditions on the earth's surface to a mapping system or a database, the system comprising:

a first processing system responsive to transmitted signals from global positioning satellites for computing location information;

a second processing system responsive to transmitted signals from remote sensing satellites for generating image data representative of sensed conditions of the earth's surface;

a memory unit containing representations of images of the earth's surface; and a geometric correction unit coupled to the memory unit and responsive to the location information and the image data representative of sensed conditions on the earth's surface for applying a geometric correction to the image data representative of sensed conditions on the earth's surface to produce geometrically corrected image data representative of sensed conditions on the earth's surface, wherein the second processing system comprises a wavelength/reflectance correlator responsive to the transmitted signals from remote sensing satellites to generate spectroscopic data, and a striping noise correction unit responsive to the spectroscopic data for producing spectroscopic data corrected for noise and distortion, and wherein the data representative of sensed conditions at the earth's surface produced by the second processing system corresponds to the corrected spectroscopic data.

32. A method for providing global information comprising:

a) processing signals received from global positioning satellites to produce location information;

b) processing signals received from remote sensing satellites to produce image data representative of sensed conditions on the earth's surface;

c) storing data representative of images of the earth's surface in a memory unit; and d) geometrically correcting the image data representative of sensed conditions on the earth's surface in accordance with the location information and the stored data representative of images of the earth's surface, wherein the image data representative of sensed conditions at the earth's surface produced by the second processing step corresponds to corrected spectroscopic data and the processing of signals received from remote sensing satellites includes correlating wavelength/reflectance signals from the remote sensing satellites to generate spectroscopic data, and further comprising the step of correcting said spectroscopic data for noise and distortion.

* * * * *